(12) United States Patent
Meyer et al.

(10) Patent No.: US 9,004,619 B2
(45) Date of Patent: Apr. 14, 2015

(54) MOBILE MACHINE TRACK SHOE

(71) Applicant: Caterpillar Inc., Peoria, IL (US)

(72) Inventors: Robert Lee Meyer, Metamora, IL (US); Mark Steven Diekevers, Metamora, IL (US); Gregory Jerome Kaufmann, Metamora, IL (US); William Jay Ulrich, IV, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/258,174

(22) Filed: Apr. 22, 2014

(65) Prior Publication Data
US 2014/0225427 A1    Aug. 14, 2014

Related U.S. Application Data

(63) Continuation of application No. 13/173,982, filed on Jun. 30, 2011, now Pat. No. 8,876,227.

(51) Int. Cl.
*B62D 55/26* (2006.01)
*B62D 55/28* (2006.01)

(52) U.S. Cl.
CPC ............... *B62D 55/28* (2013.01); *B62D 55/26* (2013.01)

(58) Field of Classification Search
CPC ........................................................ B62D 55/26
USPC ......... 305/185, 187, 191, 192, 196, 198, 200, 305/201
See application file for complete search history.

(56) References Cited

U.S. PATENT DOCUMENTS

| | | | |
|---|---|---|---|
| 1,258,604 A | 3/1918 | Holt | |
| 1,258,608 A | 3/1918 | Turnbull | |
| 1,343,958 A | 6/1920 | Blewett | |
| 1,370,757 A | 3/1921 | Moon | |
| 1,450,471 A | 4/1923 | Wickersham | |
| 1,872,819 A | 8/1932 | Rorabeck | |
| 1,952,545 A | 3/1934 | Gotshall | |
| 2,353,124 A | 7/1944 | Burgess | |
| 2,494,108 A | 1/1950 | Sinclair | |
| 2,548,626 A | 4/1951 | Sinclair | |
| 2,549,930 A | 4/1951 | Riegel et al. | |
| 2,670,997 A | 3/1954 | Waller | |
| 2,712,964 A | 7/1955 | Waller | |
| 2,874,005 A | 2/1959 | Engström | |
| D186,214 S | 9/1959 | Francis | |

(Continued)

FOREIGN PATENT DOCUMENTS

| | | |
|---|---|---|
| EP | 1834863 | 9/2007 |
| JP | 57101681 | 6/1982 |
| JP | 20020296462 | 1/2002 |

OTHER PUBLICATIONS

Track Shoe photograph taken approximately Feb. 1, 2012. Chelyabinsk, Russia.

*Primary Examiner* — Ruth Ilan
*Assistant Examiner* — Laura Freedman
(74) *Attorney, Agent, or Firm* — Finnegan, Henderson, Farabow, Garrett & Dunner, LLP

(57) ABSTRACT

A mobile machine track shoe includes a ground engaging surface including a first grouser bar and a second grouser bar substantially parallel to the first grouser bar. The track shoe further includes a base opposite the ground engaging surface. The base includes a first relief disposed opposite the first grouser bar, and a second relief disposed opposite the second grouser bar.

19 Claims, 3 Drawing Sheets

(56) References Cited

U.S. PATENT DOCUMENTS

| | | |
|---|---|---|
| 2,903,303 A | 9/1959 | Weller |
| 3,089,021 A | 5/1963 | Hawes et al. |
| 3,372,959 A | 3/1968 | Watts, Jr. |
| 3,762,780 A | 10/1973 | Tomizawa |
| 3,937,529 A | 2/1976 | Becker et al. |
| 3,972,570 A | 8/1976 | Massieon |
| 4,021,082 A | 5/1977 | Rasmussen |
| 4,324,437 A | 4/1982 | Narang |
| 4,805,968 A | 2/1989 | Connerley |
| 5,255,964 A | 10/1993 | Hara |
| 5,938,300 A | 8/1999 | Fukuda et al. |
| 5,984,437 A | 11/1999 | Katoh |
| D598,937 S | 8/2009 | Lyasko |
| 7,614,709 B2 | 11/2009 | Oertley |
| 2004/0032166 A1 | 2/2004 | Maguire et al. |
| 2005/0040708 A1 | 2/2005 | Yamamoto et al. |

MOBILE MACHINE TRACK SHOE

CROSS-REFERENCE TO RELATED APPLICATIONS

This is a continuation of application Ser. No. 13/173,982, filed Jun. 30, 2011, the entire disclosure of which is incorporated herein by reference.

TECHNICAL FIELD

The present disclosure relates generally to the undercarriage of a mobile machine and, more particularly, to a track shoe for a mobile machine.

BACKGROUND

A track type mobile machine utilizes tracks on either side of the machine that are connected to ground engaging elements known as track shoes to move the machine. Specifically, a sprocket driven by an engine of the machine engages links of the track to translate the track about spaced apart pulley mechanisms. As the track translates about the pulley mechanisms, connected track shoes engage a work surface under the machine to transmit torque from the sprocket to the surface in a direction opposite the desired travel direction of the machine, thereby propelling the machine.

A known track shoe is discussed in U.S. Pat. No. 4,805,968 ("the '968 patent") to Connerley, issued on Feb. 21, 1989. The '968 patent teaches a track shoe for a construction vehicle having a ground-contacting portion, a substantially flat body portion, and a grouser extending transversely across a width of the track shoe. The '968 patent explains that the grouser provides strength to the track shoe, and increases traction between the track shoe and the ground to assist in moving the vehicle. The track shoe taught in the '968 also includes a plurality of ribs reinforcing the body portion along a length of the track shoe.

Such known track shoes, however, suffer from a variety of drawbacks hindering the performance of the associated mobile machine. For instance, such track shoes are generally formed from standard low carbon content steels and/or other like materials. While such materials are more ductile (i.e., less brittle) than materials having a greater carbon content, such materials may be more prone to wear, thereby reducing the useful life of the track shoe and increasing the maintenance costs associated with the mobile machine.

Track shoes made from such materials may also be relatively heavy, and since mobile machines employ tracks having a large number of track shoes, the track shoes make up a significant percentage of the overall mass of the undercarriage. Accordingly, utilizing such relatively high mass track shoes adversely affects fuel consumption of the mobile machine, further increasing operating costs. The relatively high mass of such track shoes also makes replacing and/or repairing such track shoes more cumbersome.

The disclosed track shoes are directed to overcoming one or more of the problems set forth above.

SUMMARY OF THE INVENTION

In an exemplary embodiment of the present disclosure, a mobile machine track shoe includes a ground engaging surface including a first grouser bar and a second grouser bar substantially parallel to the first grouser bar. The track shoe further includes a base opposite the ground engaging surface. The base includes a first relief disposed opposite the first grouser bar, and a second relief disposed opposite the second grouser bar.

In another exemplary embodiment of the present disclosure, a track shoe for a mobile machine includes a ground engaging surface. The ground engaging surface includes first and second substantially planar flats, a first grouser bar disposed between a trailing edge of the track shoe and the first flat, and a second grouser bar disposed between the first and second flats. The ground engaging surface also includes a third grouser bar disposed between the second flat and a leading edge of the track shoe. The first and third grouser bars are spaced substantially equally from the second grouser bar. The track shoe also includes a base opposite the ground engaging surface. The base includes a first relief disposed opposite the first grouser bar, and a second relief disposed opposite the second grouser bar and substantially parallel to the first relief. In addition, the track shoe includes steel having a carbon content greater than approximately 0.3%.

In a further exemplary embodiment of the present disclosure, a track shoe for a mobile machine includes a ground engaging surface including a first grouser bar, a second grouser bar substantially parallel to the first grouser bar, and a third grouser bar substantially parallel to the second grouser bar. At least one of the first, second, and third grouser bars has a height less than approximately 26 mm, and a width between approximately 12.6 mm and approximately 14.2. A combined width of the first, second, and third grouser bars comprises approximately one quarter of an overall length of the track shoe. The track shoe also includes a base opposite the ground engaging surface. The base includes a first relief and a second relief substantially parallel to the first relief. The first relief includes a first radius and the second relief includes a second radius less than the first radius. In addition, a centerline of the first grouser bar is collinear with a centerline of the first relief and a centerline of the second grouser bar is collinear with a centerline of the second relief.

DETAILED DESCRIPTION

Figure 1:
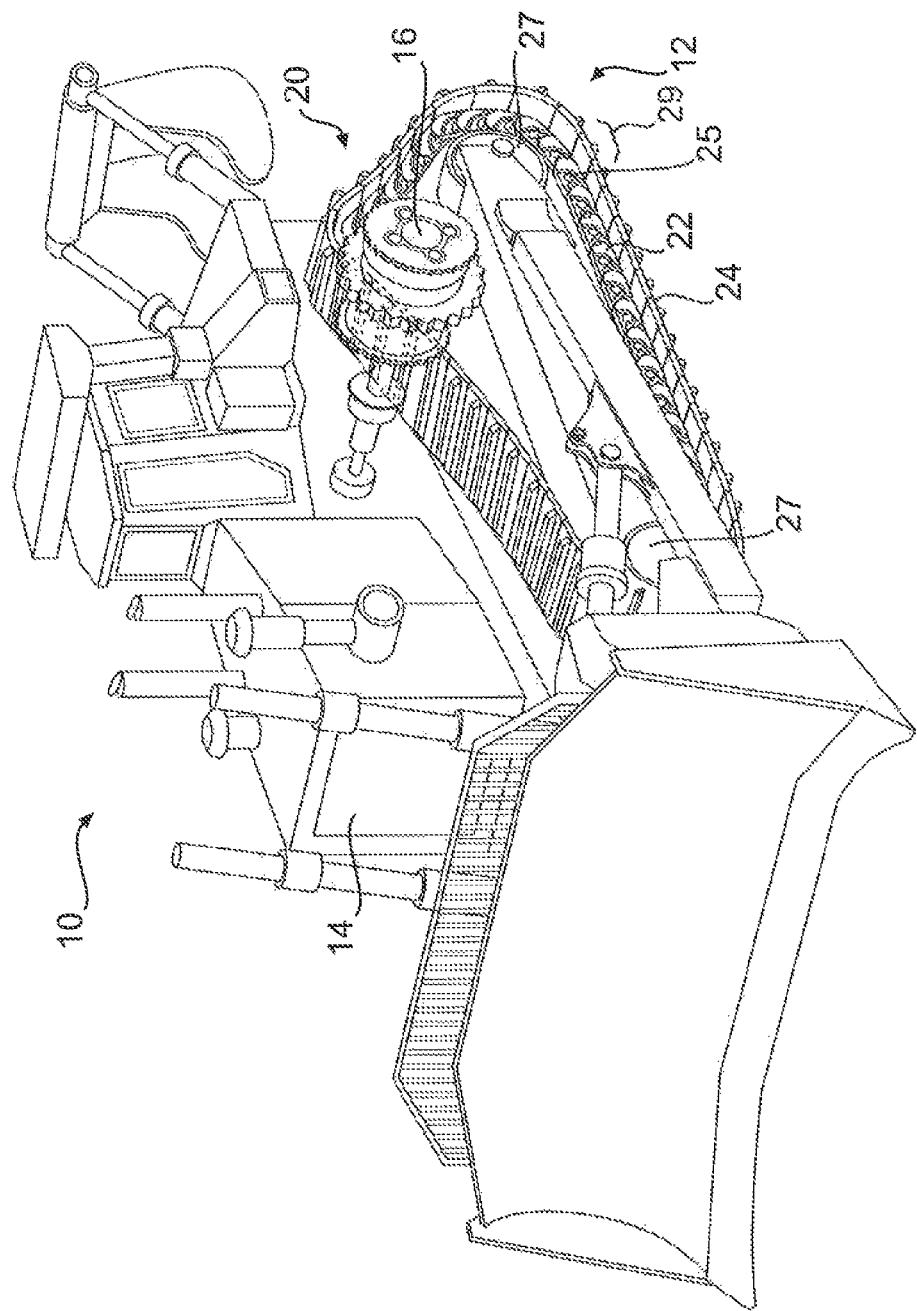
FIG. 1 is a pictorial illustration of an exemplary mobile machine.

FIG. 1 illustrates a track type mobile machine 10 having a power source 14 driving a tracked undercarriage 12. Mobile machine 10 may be a machine that performs an operation associated with an industry such as mining, construction, farming, or any other industry known in the art. For example, machine 10 may be an earth moving machine such as a dozer, a loader, an excavator, or any other earth moving machine.

Power source 14 may drive the tracked undercarriage 12 of machine 10 at a range of output speeds and torques. Power source 14 may be an engine such as, for example, a diesel engine, a gasoline engine, a gaseous fuel-powered engine, or any other suitable engine. Power source 14 may also be a non-combustion source of power such as, for example, a fuel cell, a power storage device, or any other source of power known in the art.

Tracked undercarriage 12 may include tracks 20 (only one shown in FIG. 1) driven by power source 14 via sprockets 16 (only one shown in FIG. 1). Each track 20 may include a chain 22 with attached ground control devices called track shoes 24.

Each chain 22 may comprise a plurality of chain links 29 connected to each other by rod assemblies 25. Sprockets 16 may engage and transmit a torque to rod assembly 25 to thereby move the chain 22 about spaced apart pulley mechanisms 27. Each chain link 29 may include two opposing sides, and each side may include two track links. In an exemplary embodiment, at least two such track links may be connected to each track shoe 24, and in further exemplary embodiments, the two track links on each opposing side of the chain link 29 (four track links total) may be connected to each track shoe 24. The track shoe 24 may be joined to such track links by way of a plurality of threaded fasteners (not shown), corresponding thru holes 30 (FIG. 3) formed in the track shoe 24, and threaded holes (not shown) formed in the track links. That is, each track shoe 24 may be joined to track links by cap screw-type fasteners, bolts, and/or other like threaded fasteners passing through respective through holes 30 formed in the track shoe 24.

Figure 2:
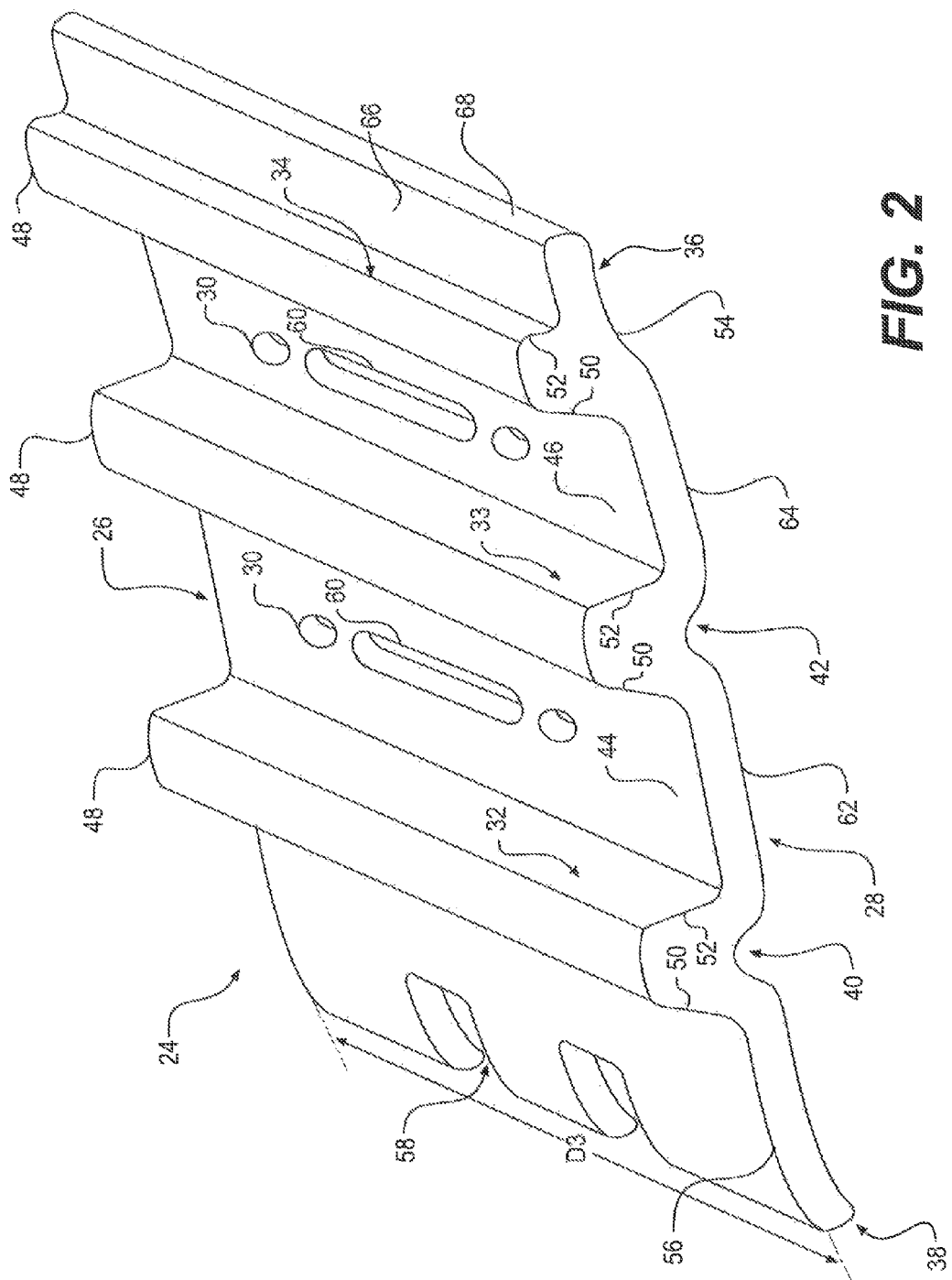
FIG. 2 is an isometric view of an exemplary track shoe.

As shown in FIG. 2, the track shoe 24 may include a substantially planar base 28, and a ground-engaging surface 26 opposite the base 28. In each of the embodiments discussed herein, the base 28 may be disposed on a first side of the track shoe 24, and the ground engaging surface 26 may be disposed on a second side of the track shoe 24 opposite the first side. The base 28 may be configured to mate with one or more track links and/or other components of the track 20 described above. The ground engaging surface 26, on the other hand, may be configured to act on a work surface of the worksite or other environment in which the machine 10 is employed.

As discussed above, the track shoe 24 may include one or more thru holes 30 extending from the ground engaging surface 26 to the base 28. The thru holes 30 may be shaped, sized, located, and/or otherwise configured to accept a corresponding fastener (not shown), and such fasteners may assist in coupling the track shoe 24 to one or more track links. The track shoe 24 may also include one or more passages 60 extending from the ground engaging surface 26 to the base 28. The passages 60 may be useful in permitting, for example, dirt, mud, stones, water, and/or other like work surface materials to pass therethrough during operation of the track 20. Although the passages 60 are illustrated in FIG. 2 as being substantially rectangular, in other exemplary embodiments, the passages 60 may be substantially oval shaped, substantially round, and/or any other shape, size, and/or configuration to facilitate passage of such materials during operation of the track 20. Such passages 60 may be of like size, shape, and/or configuration, or as shown in FIG. 2, a first passage 60 may have a different shape, size, and/or configuration than a second passage 60 of the track shoe 24. For instance, a first passage 60 may be larger than a second passage 60 of the track shoe 24. Each of the passages 60 may be positioned proximate the center of the track shoe 24, proximate edges thereof, and/or at any other locations along the ground engaging surface 26 of the track shoe 24 to facilitate passage of work surface materials therethrough.

The track shoe 24 may also include one or more cutouts 58 disposed proximate a trailing edge 38 thereof. Cutouts 58 may be substantially U-shaped, substantially square, substantially rectangular, and/or any other like shape. Such cutouts 56 may be configured and/or positioned to facilitate passage of any of the work surface materials discussed above therethrough. In addition, the cutouts 58 may be configured to accept a portion of the chain 22 (FIG. 1) during operation of the track 20. It is understood that the cutouts 58, passages 60, and/or other elements of the track shoe 24 may be formed through mechanical cutting, laser cutting, scribing, milling, drilling, and/or any other known process. In additional exemplary embodiments, the track shoe 24 may be forged or cast, and in such exemplary embodiments, one or more of cutouts 58 and/or passages 60 may be formed in the track shoe 24 during such a process. In still further exemplary embodiments, an ingot or bloom of desired material may be rolled and/or otherwise formed into lengths having a desired track shoe profile. Such rolled lengths may be referred to as "special sections," and such special sections may have lengths of up to 100 ft, or longer. In exemplary embodiments, individual track shoes 24 may be cut from the rolled special sections. The cutouts 58, passages 60, and/or other elements of the track shoes 24 may then be formed in the individual track shoes 24 through cutting, drilling, etching, and/or other known processes.

The track shoe 24 may be formed from any metal known in the art such as, for example, steel, aluminum, and/or alloys thereof. In an exemplary embodiment, the entire track shoe 24 may be formed from a single material. In additional exemplary embodiments, one or more portions of the track shoe 24 may be formed from a first material, and a remainder of the track shoe 24 may be formed from a second material different from the first material. In such exemplary embodiments, the various different portions of the track shoe 24 may be coupled together through welding, mechanical coupling, and/or other known joining processes.

In additional exemplary embodiments, the track shoe 24 may be formed from a relatively low mass, high yield strength material such as, for example, SAE 15B34 steel, SAE 40BV40 steel, SAE 15B27 steel, and/or other like materials. Such materials may be hardened through cladding and/or other known material hardening processes to further increase yield strength. As used herein, the term "yield strength" means the degree to which the track shoe 24 may be subjected to a constant load before becoming permanently deformed. A track shoe having a higher yield strength will be capable of greater deflection before suffering a permanent deformation than a track shoe having a relatively lower yield strength. For example, SAE 15B34, SAE 40BV40, and/or SAE 15B27 steel may have a higher carbon content than standard track shoe steels, thereby resulting in a relatively higher yield strength, greater hardness, and improved resistance to wear. In exemplary embodiments, such high carbon content steels may have a carbon content greater than approximately 0.3% by weight, whereas standard track shoe steels may have a carbon content less than 0.3%.

As shown in FIG. 2, the ground engaging surface 26 may include one or more grouser bars. For example, the ground engaging surface 26 of the track shoe 24 may include first and second grouser bars 32, 33, and in an exemplary embodiment, the ground engaging surface 26 of the track shoe 24 may also include a third grouser bar 34. Each of the grouser bars 32, 33, 34 may be substantially parallel to one another, and each grouser bar 32, 33, 34 may be disposed along a width D3 of the track shoe 24. In further exemplary embodiments, at least two of the grouser bars 32, 33, 34 may be non-parallel. The shape, size, and location of each of the grouser bars 32, 33, 34 may improve performance of the track shoe 24, in particular, the height, width, and/or location of each grouser bar 32, 33, 34 may maintain and/or increase the yield strength of track shoes 24. The greater the overall size of the grouser bar 32, 33, 34, the greater the yield strength of the resulting track shoe 24. Such grouser bar configurations may also enable the thickness and/or mass of high carbon content track shoes 24 to be decreased through various other modifications to the track shoes 24.

For example, utilization of high carbon content steels such as, for example, SAE 15B34, SAE 40BV40, and/or SAE 15B27 steel to form the track shoe 24 may allow for the use of grouser bars having reduced height and width as compared to conventional grouser bars, without compromising the yield strength of the resulting track shoe 24. The reduced dimensions of the grouser bars 32, 33, 34 may, in turn, reduce the overall mass and cost of manufacturing the track shoe 24. For example, track shoes made from standard low carbon content steels, and having standard sized grouser bars, may generally have a yield strength between approximately 1205 Mpa and approximately 1960 Mpa, and may generally have a mass greater than approximately 20 kg. However, utilizing high carbon content steels such as, for example, SAE 15B34, SAE 40BV40, and/or SAE 15B27 steel, in conjunction with the reduced grouser bar heights and widths discussed herein, may result in a track shoe 24 having a substantially reduced mass while maintaining a yield strength between approximately 1205 Mpa and approximately 1960 Mpa. In further exemplary embodiments, such track shoes 24 may have a yield strength between approximately 1000 Mpa and approximately 2000 Mpa. The mass of the high carbon content track shoes 24 described herein may be further reduced by minimizing the thickness of the track shoe 24. For example, such track shoes 24 may have a mass between approximately 10 kg and approximately 15 kg. In exemplary embodiments, such track shoe 24 may have a mass less than approximately 12.8 kg, and in further exemplary embodiments, the track shoe 24 may have a mass less than approximately 11.5 kg. The mass of the high carbon content track shoes 24 described herein may be between approximately 10% and approximately 30% less than corresponding masses of similar track shoes made from standard track shoe steels.

Figure 3:
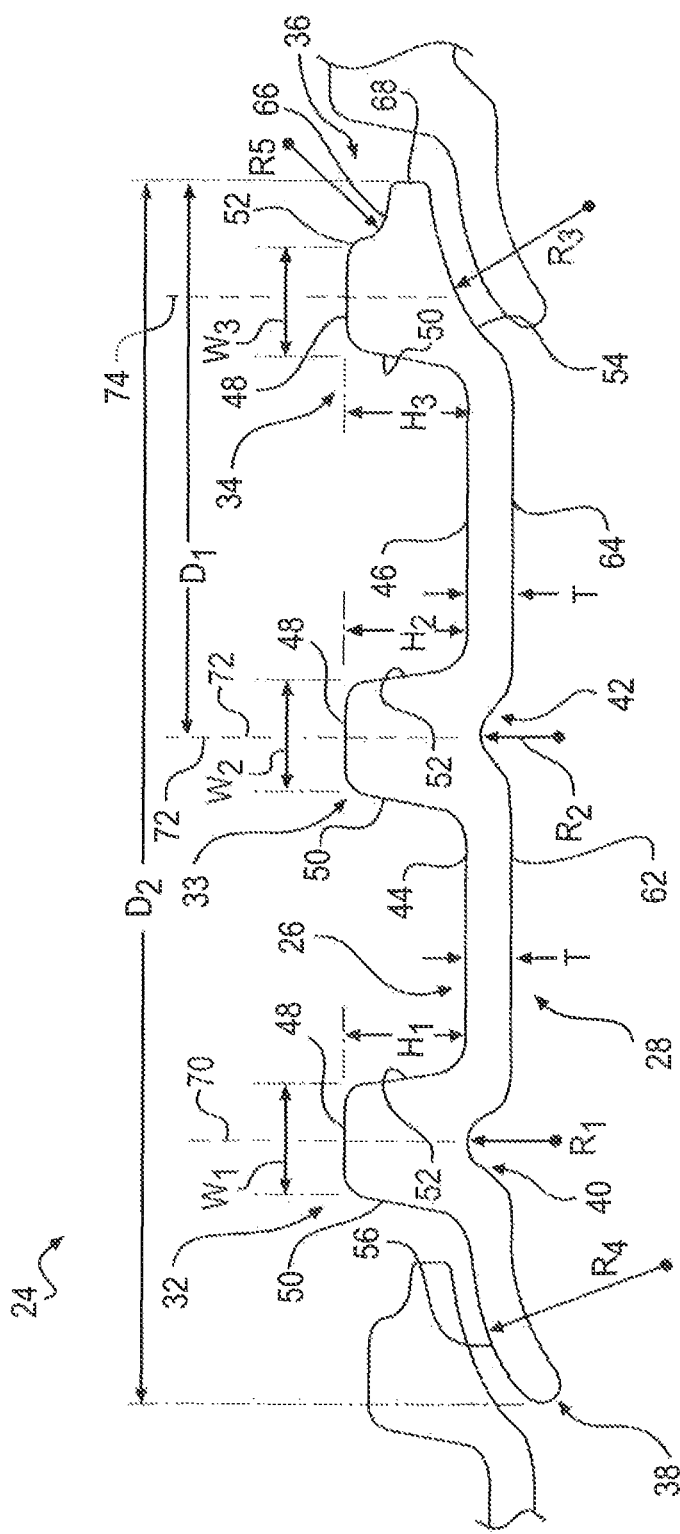
FIG. 3 is a side elevation view of the exemplary track shoe shown in FIG. 2.

As noted above, in order to achieve such reduced mass with track shoes formed from high carbon content steels without compromising the resulting yield strength of the track shoe 24, the grouser bars 32, 33, 34 may be formed to have particular heights and/or widths. In exemplary embodiments of the present disclosure, the respective heights and/or widths of the grouser bars 32, 33, 34 may be substantially equal, while in further exemplary embodiments, each grouser bar 32, 33, 34 may have a different respective height and/or width. For example, as shown in FIG. 3, the first grouser bar 32 may have a width W1 between approximately 21.2 mm and approximately 24.8 mm. In such an exemplary embodiment, the second grouser bar 33 may have a width W2 between approximately 14.4 mm and approximately 17.6 mm. In addition, in such an exemplary embodiment, the third grouser bar 34 may have a width W3 between approximately 15.8 mm and 16.2 mm. In further exemplary embodiments, at least one of the grouser bars 32, 33, 34 may have a width between approximately 12.6 mm and approximately 14.2 mm. In still further exemplary embodiments, at least one of the grouser bars 32, 33, 34 may have a width between approximately 10 mm and approximately 50 mm. These dimensions, while minimizing the overall mass of the high carbon content track shoe 24, may also maintain a yield strength of the track shoe 24 between approximately 1205 Mpa and approximately 1960 Mpa.

As shown in FIG. 2, the ground engaging surface 26 may include at least one substantially planar flat 44, and the flat 44 may be disposed adjacent to at least one of the grouser bars 32, 33, 34. For example, the ground engaging surface 26 may include a first substantially planar flat 44 disposed between the first and second grouser bars 32, 33, and a second substantially planar flat 46 disposed between the second and third grouser bars 33, 34. At least one of the flats 44, 46 may also be disposed along the width D3 of the track shoe 24. Each of the grouser bars 32, 33, 34 may include a respective first and second side wall 50, 52, and each of the widths W1, W2, W3 may extend between the respective first and second side walls 50, 52. As shown in FIG. 3, such sidewalk 50, 52 may extend upward from and substantially perpendicular to at least a portion of the ground engaging surface 26.

In such exemplary embodiments, the height of each grouser bar 32, 33, 34 may also be measured from at least one of the flats 44, 46. For example, as shown in FIG. 3, a height H1 of the first grouser bar 32 may be between approximately 18.5 mm and approximately 21.5 mm, and the height H1 may extend from the flat 44 to a top surface 48 of the grouser bar 32. In such an exemplary embodiment, a height H2 of the second grouser bar 33 may be between approximately 19.5 mm and approximately 22.5 mm, and the height H2 may extend from the flat 46 to a top surface 48 of the second grouser bar 33. Moreover, a height H3 of the third grouser bar 34 may be between approximately 20 mm and approximately 23 mm, and the height H3 may extend from the flat 46 to a top surface 48 of the grouser bar 34. In further exemplary embodiments, at least one of the grouser bars 32, 33, 34 may have a height less than approximately 26 mm. In still further exemplary embodiments, at least one of the grouser bars 32, 33, 34 may have a height between approximately 10 mm and approximately 130 mm.

As shown in FIG. 3, the track shoe 24 may also include a leading edge 36 opposite the trailing edge 38. The first grouser bar 32 may be disposed proximate the trailing edge 38, the third grouser bar 34 may be disposed proximate the leading edge 36, and the second grouser bar 33 may be disposed between the leading edge 36 and trailing edge 38. More specifically, the first grouser bar 32 may be disposed between the trailing edge 38 and the first flat 44, the second grouser bar 33 may be disposed between the first and second flats 44, 46, and the third grouser bar 34 may be disposed between the second flat 46 and the leading edge 36. In an exemplary embodiment, the first and third grouser bars 32, 34 may be spaced substantially equally from the second grouser bar 33. In addition, the second grouser bar 33 may be approximately centrally located along the ground engaging surface 26. For example, the track shoe 24 may have an overall length D2 between approximately 222.5 mm and approximately 215.5 mm, and in an exemplary embodiment, the overall length D2 may be equal to approximately 219 mm. In such exemplary embodiments, a centerline 72 of the second grouser bar 33 may be disposed at a distance D1 between approximately 96 mm and approximately 92 mm from the leading edge 36. In such exemplary embodiments, the centerline 72 of the second grouser bar 33 may be disposed, for example, at a distance approximately 94 mm from the leading edge 36. In further exemplary embodiments, like centerlines 70, 74 of the first and third grouser bars 32, 34 may be spaced any desirable distance from the centerline 72 of the second grouser bar 33. For example, the centerlines 70, 74 of the first and third grouser bars 32, 34 may be substantially equally spaced from the centerline 72 of the second grouser bar 33. Alternatively, the first and third grouser bars 32, 34 may each be disposed at different distances from the second grouser bar 33. Such spacing may be determined through, for example, finite element analysis to maximize the yield strength of the resulting track shoe 24 given the additional dimensional and/or material composition constraints of the track shoe 24 described herein. For example, through finite element analysis, it has been determined that spacing the centerline 70 of the first grouser bar 32 from the centerline 72 of the second grouser bar 33 by approximately 72.5 mm, and spacing the centerline 74 of the third grouser bar 34 from the centerline 72 of the second grouser bar 33 by approximately 73.7 mm, maintains the yield strength of the resulting high carbon content track shoe 24 having the grouser bar widths W1, W2, W3 and heights H1, H2, H3 discussed herein between approximately 1205 Mpa and approximately 1960 Mpa.

In exemplary embodiments, the first flat 44 may include a width extending between the second sidewall 52 of the first grouser bar 32 and the first sidewall 50 of the second grouser bar 33. Additionally, the second flat 46 may include a width extending between the second sidewall 52 of the second grouser bar 33 and the first sidewall 50 of the third grouser bar 34. In such exemplary embodiments, the widths of the first and second flats 44, 46 may be approximately equal. In such exemplary embodiments, the width of at least one of the first and second flats 44, 46 may comprise approximately one quarter of the overall length D2 of the track shoe 24, and the combined width of the first and second flats 44, 46 may comprise approximately half of the overall length D2. In addition, the width W1 of the first grouser bar 32 may be approximately half of the width of at least one of the first and second flats 44, 46. Moreover, the combined width of the first, second, and third grouser bars 32, 33, 34 may be approximately equal to the width of at least one of the first and second flats 44, 46. Accordingly, the combined width of the first, second, and third grouser bars 32, 33, 34 may comprise approximately one quarter of the overall length D2. In exemplary embodiments in which the centerline 70 of the first grouser bar 32 is spaced from the centerline 72 of the second grouser bar 33 by approximately 72.5 mm, and the centerline 74 of the third grouser bar 34 is spaced from the centerline 72 of the second grouser bar 33 by approximately 73.7 mm, the width of the first flat 44 may be approximately 51.3 mm and the width of the second flat 46 may be approximately 56.8 mm.

The track shoe 24 may also include a substantially rounded tip 68 at the leading edge 36. The tip 68 may have any desirable radius in order to assist in, for example, reducing clearance between the leading edge 36 of the track shoe 24 and a trailing edge of an adjacent track shoe coupled to the track 20. The track shoe 24 may also include a substantially horizontal shelf 66 adjacent the tip 68 on the ground engaging surface 26. The shelf 66 may, for example, connect the tip 68 to the sidewall 52 of the third grouser bar 34. In an exemplary embodiment, the ground engaging surface 26 between the sidewall 52 and the shelf 66 may be rounded so as to include a desirable radius R5. Such a radius R5 may also assist in, for example, reducing clearance between adjacent track shoes during use.

The overall thickness of the track shoe 24 may be selected to assist in reducing the mass of the track shoe 24, while maintaining sufficient yield strength for excavation and/or other track shoe applications. As shown in FIG. 3, such a thickness T may be measured between the ground engaging surface 26 and the base 28. In particular, the track shoe 24 may include such a thickness T extending from the first and second flats 44, 46 of the ground engaging surface 26 to corresponding substantially planar flats 62, 64 of the base 28. It is understood that one or more of the flats 44, 46, 62, 64 may be disposed along substantially the entire width D3 of the track shoe 24. In an exemplary embodiment, the thickness T may be a thickness of at least one of the flats 44, 46, and the thickness T may be between approximately 6.5 mm and approximately 8.5 mm. In another exemplary embodiment, the thickness T may be between approximately 5 mm and approximately 30 mm. In additional exemplary embodiments, the thickness T may be approximately 7.5 mm.

In exemplary embodiments, the base 28 may include one or more reliefs 40, 42 shaped, sized, and/or disposed to reduce the mass of the track shoe 24 without significantly decreasing the yield strength thereof. For example, such reliefs 40, 42 may be shaped, sized, and/or disposed on the base 28 to minimize the amount of material used in forming the track shoe 24 without resulting in a corresponding decrease in the yield strength. The yield strength of the track shoe 24 is primarily dependent upon the material used to form the track shoe 24, and the height, width, and relative positions of the grouser bars 32, 33, 34. Forming reliefs 40, 42 by removing material from the base 28 opposite one or more of the grouser bars 32, 33, 34, on the other hand, has relatively little effect on the resulting yield strength of the track shoe 24. Accordingly, for a relatively large grouser bar, a correspondingly large relief may be disposed on the base 28 opposite the grouser bar without adversely reducing yield strength of the track shoe. In exemplary embodiments, the reliefs 40, 42 may be disposed such that the centerline 70 of the first grouser bar 32 is collinear with a centerline of the first relief 40 and the centerline 72 of the second grouser bar 33 is collinear with a centerline of the second relief 42.

As shown in FIG. 3, just as each of the grouser bars 32, 33, 34 may have a unique shape and/or size, the corresponding reliefs 40, 42 may also have unique shapes and/or sizes. The shapes and/or sizes of the reliefs 40, 42 may, however, correspond to the shapes and/or sizes of the grouser bars 32, 33, 34 opposite from which the reliefs 40, 42 are formed. For example, the first relief 40 may have a first radius R1, and the second relief 42 may have a second radius R2 less than the first radius R1. The smaller radius R2 of the second relief 42 may correspond to the smaller height H2 and/or smaller width W2 of the second grouser bar 33 relative to the corresponding dimensions of the first grouser bar 32. In exemplary embodiments, the first radius R1 may be between approximately 11 mm and approximately 12 mm, and the second radius R2 may be between approximately 4 mm and 5 mm. In further exemplary embodiments, the first radius R1 may be approximately 11.3 mm and the second radius R2 may be approximately 5 mm. In exemplary embodiments, the reliefs 40, 42 may be disposed opposite corresponding grouser bars 32, 33, along substantially the entire width D3 of the track shoe 24. In the embodiment shown in FIG. 3, the depth of the reliefs 40, 42 at their deepest point, as measured from the base 28 are less than the thickness T of the track shoe 24.

The base 28 may also include a curved portion 54. The curved portion 54 may be disposed along substantially the entire width D3 of the track shoe 24 opposite the third grouser bar 34. The curved portion 54 may have any desirable radius R3, and the radius R3 may be chosen to reduce clearance between the track shoe 24 and a trailing edge of an adjacent track shoe (shown in FIG. 3). In an exemplary embodiment, the radius R3 may be between approximately 54 mm and approximately 58 mm, and in a further exemplary embodiments, the radius R3 may be approximately 56.5 mm.

The ground engaging surface 26 may also include one or more curved portions, and in an exemplary embodiment, the ground engaging surface 26 may include a curved portion 56 adjacent to the first grouser bar 32 and proximate the trailing edge 38 of the track shoe 24. In an exemplary embodiment, the curved portion 56 of the ground engaging surface 26 may have a radius R4 that is substantially equal to the radius R3 of the curved portion 54. Such a radius R4 may assist in reducing, for example, clearance between adjacent track shoes 24. In still further exemplary embodiments, the radius R3 of the curved portion 54 may be different from the radius R4 of the curved portion 56. For example, the radius R3 of the curved portion 54 may be approximately 56.5 mm, and the radius R4 of the curved portion 56 may be approximately 55 mm.

INDUSTRIAL APPLICABILITY

The track shoes 24 of the present disclosure may be applicable to any track type mobile machine. The disclosed track shoes 24 may have greater hardness and/or yield strength characteristics relative to standard steel track shoes, thereby improving durability of the undercarriage 12. Further, the track shoes 24 of the present disclosure may lower operating cost of the mobile machine 10 by utilizing less material to form such track shoes 24, and may result in fuel savings due to reduced undercarriage mass. Each of these benefits may be achieved through the use of the high carbon content steels described above in conjunction with the unique geometry and relative placement of the grouser bars 32, 33, 34 and reliefs 40, 42.

For example, the formation of reliefs 40, 42 on the base 28 of the track shoes 24 made from a high carbon content, high yield strength steel, such as SAE 15B34, SAE 40BV40, and/or SAE 15B27 steel, may assist in reducing the resulting mass of the track shoe 24 while maintaining a desired yield strength. Thus, while the reliefs 40, 42 may add some complexity to the manufacturing process, the resulting track shoe may be superior in operation to track shoes without such reliefs.

Moreover, forming the track shoes 24 of the present disclosure through a rolling process may be less expensive than forming the track shoe 24 through forging, casting, and/or other like processes. Such processes require re-heating cylindrical rods, rectangular plates, and/or other lengths of semi-finished steel, and forming individual track shoes from the re-heated steel. Such processes are time consuming, labor intensive, and relatively costly. Rolling ingots or blooms of raw steel into lengths having the profile of the track shoes 24 described herein, on the other hand, eliminates the need for such re-heating. Instead, rolling raw steel into special sections having a profile that includes the reliefs 40, 42, grouser bars 32, 33, 34, flats 44, 46, 62, 64, and/or other portions of the track shoe 24 enables manufacturers to simply cut individual track shoes 24 from the special sections. Thus, forming track shoes 24 through a rolling process eliminates the added time, labor, and expense associated with re-working semi-finished steel.

In addition, unlike forging or casting, rolling processes, such as hot rolling, form elongated longitudinal grains in the microstructure of the steel. Such grains increase the strength, ductility, and toughness of the material. Hot rolling steels and other like materials also reorients any impurities in the material, thereby creating "stringers" that are aligned substantially parallel to the rolled surface of the material. Such stringers are highly resistant to fracture and tend to further increase the durability of the material. During the forging or casting process, on the other hand, such impurities are randomly oriented, and when intersecting with the surface of the material, such impurities can be a propagation point for cracks. As a result, track shoes 24 formed from rolling processes, such as hot rolling, are more resistant to wear and typically have a longer useful life than track shoes formed from other processes.

In exemplary embodiments, track shoes 24 of the present disclosure may be coupled to track links of the undercarriage 12 via one or more of the threaded fasteners, through holes 30, and threaded holes described above. A formed chain link 29 may then be joined to one or more additional like chain links 29 to form a completed chain 22. Such a chain 22 may be incorporated into the track 20 of a machine 10 for any of the uses described above.

It will be apparent to those skilled in the art that various modifications and variations can be made to the disclosed track shoes 24. Other embodiments will be apparent to those skilled in the art from consideration of the specification and practice of the disclosed systems. It is intended that the specification and examples be considered as exemplary only, with a true scope being indicated by the following claims and their equivalents.

What is claimed is:

1. A mobile machine track shoe having a leading edge and a trailing edge, comprising:
    a ground engaging surface including:
        a substantially planar flat,
        a first grouser bar extending substantially perpendicular to the flat and substantially parallel to the leading and trailing edges, and
        a first curved portion disposed at the leading edge; and
    a base opposite the ground engaging surface, the base including:
        a first relief disposed opposite the first grouser bar, and
        a second curved portion disposed at the trailing edge,
            wherein the first relief has a depth measured from the base to the deepest portion of the relief that is less than a thickness of the track shoe measured from the base to the flat,
    wherein the first grouser bar has a first centerline and the first relief has a second centerline collinear with the first centerline.

2. The track shoe of claim 1, further including a second grouser bar oriented substantially parallel to the first grouser bar.

3. The track shoe of claim 2, further including a second relief disposed opposite the second grouser bar.

4. The track shoe of claim 2, wherein the second grouser bar is disposed opposite the first curved portion.

5. The track shoe of claim 2, further including a third grouser bar substantially parallel to the first and second grouser bars and disposed proximate the leading edge.

6. The track shoe of claim 5, wherein the flat is a first flat including a width extending between a sidewall of the first grouser bar and a first sidewall of the second grouser bar, the track shoe further comprising a second substantially planar flat including a width extending between a sidewall of the third grouser bar and a second sidewall of the second grouser bar, wherein the widths of the first and second flats are approximately equal.

7. The track shoe of claim 6, wherein a combined width of the first and second flats comprises approximately half of an overall length of the track shoe.

8. The track shoe of claim 6, wherein a combined width of the first, second, and third grouser bars is approximately equal to the width of at least one of the first and second flats.

9. The track shoe of claim 1, wherein the first relief is disposed opposite the first grouser bar along an entire width of the track shoe.

10. The track shoe of claim 1, further including one or more through holes extending from the ground engaging surface to the base.

11. The track shoe of claim 10, further including one or more elongated passages extending from the ground engaging surface to the base.

12. The track shoe of claim 1, wherein the first curved portion has a first radius and the second curved portion has a second radius less than the first radius.

13. A mobile machine track shoe having a leading edge and a trailing edge, comprising:
- a ground engaging surface including a substantially planar flat, a first grouser bar extending substantially perpendicular to the flat and substantially parallel to the leading and trailing edges, and a second grouser bar extending substantially parallel to the first grouser bar; and
- a base opposite the ground engaging surface, the base including a first relief disposed opposite the first grouser bar wherein the first relief has a depth measured from the base to the deepest portion of the relief that is less than a thickness of the track shoe measured from the base to the flat, and
- wherein the track shoe comprises steel having a carbon content greater than approximately 0.3%.

14. The track shoe of claim 13, further including a third grouser bar substantially parallel to the first and second grouser bars and disposed proximate the leading edge.

15. The track shoe of claim 14, wherein a combined width of the first, second, and third grouser bars comprises approximately one quarter of an overall length of the track shoe.

16. The track shoe of claim 13, further including a first curved portion disposed at the leading edge, and a second curved portion disposed at the trailing edge.

17. The track shoe of claim 16, wherein the second grouser bar is disposed opposite the first curved portion.

18. The track shoe of claim 13, further including longitudinal grains formed in the microstructure of the steel.

19. A track shoe for a mobile machine, comprising:
- a ground engaging surface including a first grouser bar, a second grouser bar substantially parallel to the first grouser bar, and a third grouser bar substantially parallel to the second grouser bar, wherein
- a combined width of the first, second, and third grouser bars comprises approximately one quarter of an overall length of the track shoe; and
- a base opposite the ground engaging surface, the base including a first relief and a second relief substantially parallel to the first relief,
- wherein a centerline of the first grouser bar is collinear with a centerline of the first relief and a centerline of the second grouser bar is collinear with a centerline of the second relief, and
- wherein the track shoe comprises steel having a carbon content greater than approximately 0.3% and further includes longitudinal grains formed in the microstructure of the steel.

* * * * *